Dec. 27, 1938.   F. W. CURTIS   2,141,263
INDEXING WORK HOLDER
Filed Nov. 29, 1935
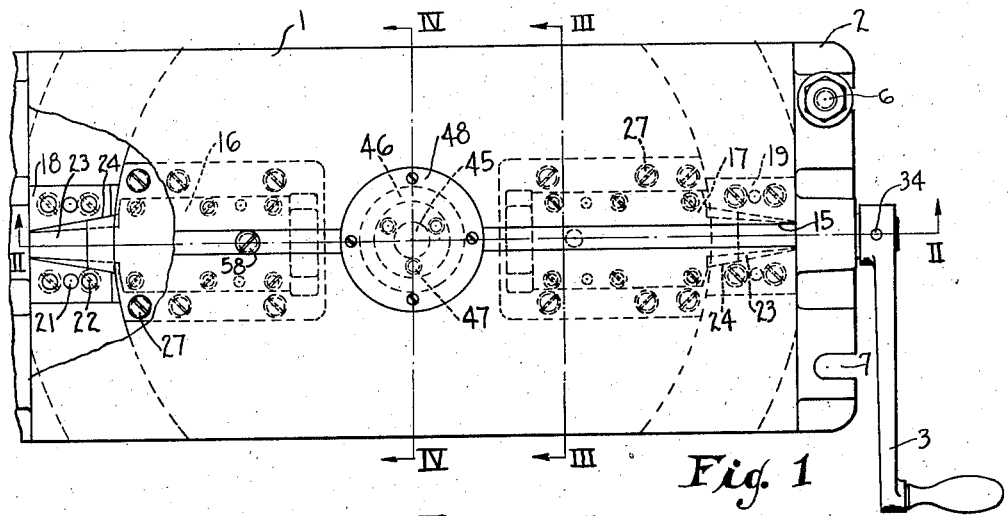
Fig. 1
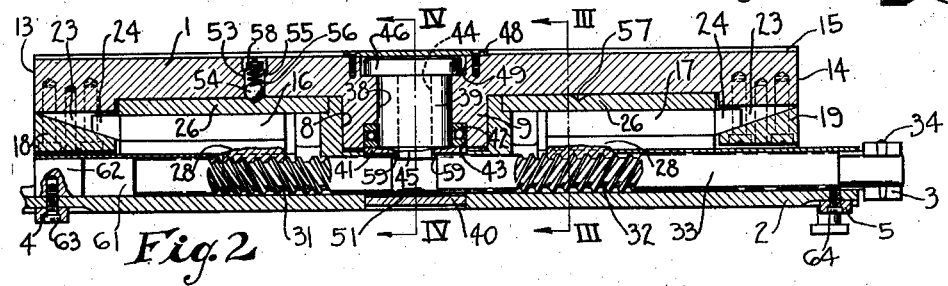
Fig. 2
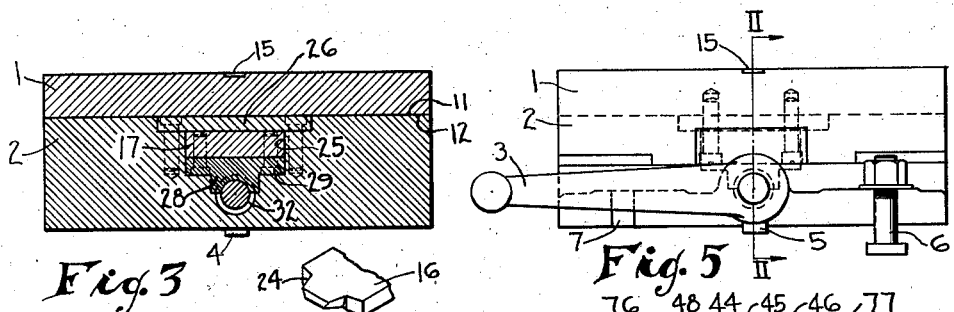
Fig. 3   Fig. 5
Fig. 7
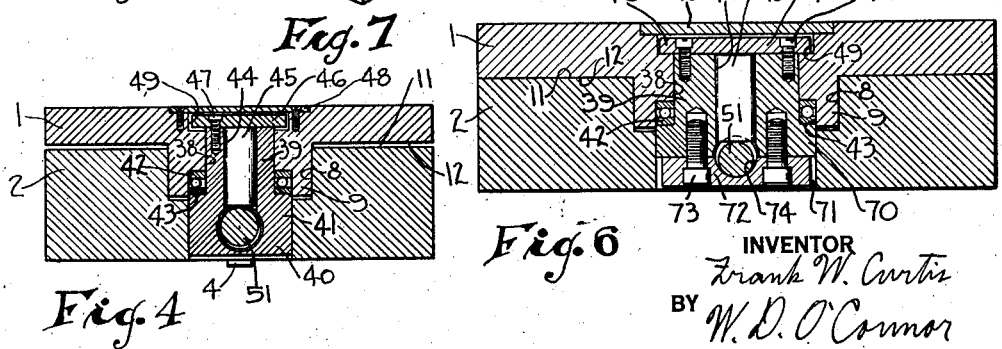
Fig. 4   Fig. 6
INVENTOR
Frank W. Curtis
BY W. D. O'Connor
ATTORNEY Patented Dec. 27, 1938

2,141,263

UNITED STATES PATENT OFFICE 2,141,263

INDEXING WORK HOLDER

Frank W. Curtis, Wauwatosa, Wis., assignor to Kearney & Trecker Corporation, West Allis, Wis.

Application November 29, 1935, Serial No. 52,138

14 Claims. (Cl. 90—58)

This invention relates generally to work supporting apparatus for machine tools and the like, and more particularly to a work holder of the type having a table adapted to be rotatably indexed to a plurality of predetermined positions.

A general object of the invention is to provide an improved rotatable indexing work holder of simple and rugged construction for successively presenting work pieces to the cutting elements of a machine tool.

Another object of the invention is to provide an improved manually operated rotatable indexing table that may readily be rotated to and locked in any one of two or more predetermined positions for successively presenting work pieces to the cutter of a machine tool in rapid production machining operations.

A further object of the invention is to provide a rotatable work holding table in which the table locking means may be released and the table lifted from its base and supported on a thrust bearing for rotation to a new position by a single movement of an operating lever.

A further object is to provide improved and simplified locating and clamping means for a rotary work holding table that cooperates with means for reducing the table friction when the table is unlocked for manual rotation to a new position.

A further object is to provide an indexing work holder in which the locking means for the table functions both to locate the table accurately in predetermined position and to clamp it securely to the base.

A further object is to provide locking means for a rotary table including a plurality of locking elements that are actuated in cooperating manner to engage the table with equalized locking pressure.

A further object is to provide an indexing work holder which is actuated by an operating shaft having a threaded portion and a cam portion, the threaded portion serving to lock the table to or unlock it from its base and the cam portion serving to lift the table from the base for rotation relative thereto.

It is still another object of the invention to provide a unitary rotatable indexing work holder of simplified and improved construction that is particularly adapted to be applied to a milling machine as an accessory attachment.

According to this invention, a rotatable work supporting apparatus of the type including a fixed base carrying a pivotally mounted work holding table is provided, in a typical embodiment, with diametrically opposed locking bolts arranged in the base to engage the table in any one of a plurality of predetermined positions in manner to accurately position it and to clamp it to the base. The bolts are actuated simultaneously in opposite directions with equalized pressure by means of an operating shaft having oppositely threaded portions and mounted for endwise equalizing movement. To provide for ease in turning the table, the operating shaft has a cam portion which, when the bolts are being retracted, functions to lift the table slightly for turning on a thrust bearing to a new position. A spring pressed detent is provided for approximately locating the table in the selected new position. In a modified form of the apparatus, means are provided for cooperating with the cam to effect additional clamping action at the mid portion of the table.

The foregoing and other objects of this invention will become apparent and be more fully understood upon reading the following description of typical embodiments of the invention shown by way of illustration in the accompanying drawing, in which:

Figure 1 is a plan view of a rotatable work supporting indexing table apparatus embodying the invention, part of the table having been broken away to better show the locking means;

Fig. 2 is a view of the apparatus in longitudinal section taken on the plane represented by the lines II—II, in Figs. 1 and 5;

Fig. 3 is a view in transverse section taken on the plane represented by the lines III—III in Figs. 1 and 2;

Fig. 4 is a view in medial transverse section taken on the plane represented by the lines IV—IV in Figs. 1 and 2, and showing the table in raised position;

Fig. 5 is a view of the indexing table apparatus in end elevation taken from the right in Figs. 1 and 2;

Fig. 6 is a view in medial transverse section, corresponding to Fig. 4, of an indexing table apparatus embodying a modification of the invention; and, Fig. 7 is a perspective view of the socket engaging end of a locking bolt for locating and clamping the table.

The embodiments of the invention shown in the drawing illustrate indexing table apparatus of the type adapted to be mounted, as a unitary attachment, on a milling machine or like machine tool in well known manner. In general, typical apparatus exemplifying the invention comprises essentially a rotatable work supporting platen or table 1 pivotally mounted on a base 2 in such manner that it may be turned to and locked in any one of a plurality of predetermined working positions. In the particular construction shown, the table is of rectangular shape and is arranged for locking in two positions disposed at 180° to each other, in order that the operator of the machine tool may load one end of the table with an unfinished work piece while another work piece is being machined at the other end of the table. When the machining operation on the work piece is completed, the table 1 is released from the base 2 by actuating an operating crank handle or lever 3 and then turned, with its supported work pieces, through an angle of 180° to bring the fresh work piece into machining position. The table is then accurately indexed and locked in the new position by moving the operating handle 3 in the other direction, and the fresh piece is fed to the cutter. While the new piece is being machined, the finished work piece is removed from the table and replaced by another unfinished piece to be machined.

This loading and unloading of work pieces is done at the end of the table adjacent to the lever 3, (the right end as seen in Figs. 1 and 2) and the machining operations occur at the other end of the table, distant from the operator's position. By this method of operation, very little delay is occasioned in changing work pieces and the machining of successive pieces progresses nearly as a continuous operation.

For mounting the indexing table apparatus as a unit in predetermined position on a machine tool, the base 2 is provided near its ends with depending guiding lugs or tongues 4 and 5 respectively which are adapted to fit into a T-slot on the reciprocating work table of the machine tool to accurately align the rotatable table with the table of the machine tool. The indexing apparatus is then clamped in aligned position on the table of the machine by a plurality of bolts of the type represented by bolt 6, which engage in T-slots of the machine table and enter clamping slots 7 at the end of the base 2 in such manner that, when tightened, they secure the base rigidly to the machine in well known manner.

To pivotally mount the table 1, the base 2 is provided with a vertically disposed central cylindrical bore or opening 8 that rotatably receives a cooperating depending central hub or boss 9 of the table. On its upper side the base 2 is provided with a flat bearing or supporting surface 11 which cooperates with a complementary flat bearing surface 12 on the under side of the rotatable table 1 in such manner as to rigidly engage and support the table and the work carried thereby during a cutting operation. The table 1 is provided at its ends with depending or over-hanging arcuate portions 13 and 14, respectively, which engage rounded ends of the base 2 for assisting in retaining the table in central position on the base and that function to exclude foreign matter from between the cooperating supporting surfaces 11 and 12. For centering or positioning work pieces or work holding fixtures relative to the machine tool, the table 1 is provided with a longitudinal slot 15 that is disposed in alignment with the guiding lugs 4 and 5 on the base 2 when the table is locked to the base and that serves to locate the work pieces in corresponding positions at each end of the table to be successively presented to the cutter as the table is indexed.

The means for accurately locating and clamping the table 1 to the base 2 in predetermined angular position comprises two locking bolts 16 and 17 slidably fitted in the base at diametrically opposed positions and arranged for simultaneous radially outward movement in opposite directions into locking engagement with cooperating hardened locking blocks 18 and 19 respectively that are rigidly secured to the table beneath the depending end portions 13 and 14 thereof as shown in Fig. 2. The blocks 18 and 19 are of similar shape and are secured accurately in position beneath the ends of the table by means of dowel pins 21 and cap screws 22. As may be seen at the left end of the table in Fig. 1, the locking block 18, for example, is provided with a tapered opening or socket 23 preventing guiding side wall surfaces that flare upwardly and outward circumferentially at an angle of about 30° to the vertical and that converge towards the radially outer end thereof, forming a tapered guide socket for receiving and cooperating with the sides of a complementarily shaped tapered end portion 24 of the cooperating locking bolt 16 (shown in Fig. 7) in manner to guide the table accurately into predetermined angular position. The lower surface of the tapered socket 23 slopes upwardly and radially outward, as may best be seen in Fig. 2, to engage a complementary sloping lower surface of the tapered end portion 24 of the bolt 16 in manner to effect a downward clamping action drawing the table into close contact with the supporting surface 11 of the base 2 to support it rigidly in the predetermined angular position.

By this arrangement, when the bolts 16 and 17 are moved radially outward, they accurately position the table angularly and simultaneously force it into clamping engagement with the base.

The bolts 16 and 17 are mounted to slide in radial slots or channels 25 formed in the base 2 and they are retained therein by cover plates 26 that are countersunk into the top of the base 2 in manner to lie flush therewith constituting a continuation of the supporting surface 11, and that are secured thereto by cap screws 27. To provide for moving the bolts into or out of locking engagement with the blocks 18 and 19, each of the bolts 16 and 17 is provided on its lower surface near its inner end with a threaded half-nut 28 secured thereto by cap screws 29. The half-nuts 28 of the bolts 16 and 17 engage respectively with complementary oppositely threaded portions 31 and 32 disposed in spaced relation on an operating shaft 33. The shaft 33 is rotatably journaled in the base 2 at right angles to the axis of rotation of the table and extends at one end for receiving the operating lever 3 which is secured to it by means of a tapered pin 34. In order to cause the bolts 16 and 17 to move in opposite directions respectively, when the shaft 33 is turned on its axis by the operating lever 3, the portions 31 and 32 of the shaft are threaded in opposite directions. To effect rapid movement of the bolts, the threaded portions 31 and 32 are of steep pitch and are preferably provided with quadruple threads as shown, the pitch of the threads being such that the operating lever 3 need be moved through only one-half turn to move the locking bolts 16 and 17 from engaged position to disengaged position, or vice versa. With the locking mechanism in the position shown in the drawing, a half turn of the operating handle 3 in clockwise direction, as seen in Fig. 5, is sufficient to retract the bolts 16 and 17, moving them toward the center of the base and out of engagement with the blocks 18 and 19 respectively to free the table 1 for rotation to a new position.

In order that the table 9 may be rotated manually from one position to another with little effort, means are provided for lifting the table out of contact with the supporting surface 11 of the base 2 when the lever 3 is operated to retract the locking bolts. The lifting means includes a thrust bearing arranged to support the entire weight of the table and its load for turning with minimum frictional resistance. As shown in Figs. 2 and 4, the table 1 is provided with a central bore 38 extending axially through the hub 9 for receiving a cylindrical boss 39 of a centrally located lifting member 40. The lifting member 40 is formed with a lower cylindrical portion 41 of larger diameter than the boss 39 and disposed within a complementary cylindrical central opening in the base 2 beneath the hub 9 of the table. For admitting the shaft 33, the portion 41 is provided with a transverse bore of somewhat larger diameter than the shaft to provide clearance for vertical movement of the lifting member relative to the shaft.

Above the enlarged portion 41 and encircling the boss 39 of the lifting member 40, there is disposed an anti-friction thrust bearing 42 resting on a shoulder or abutment formed by the top of the portion 41 and positioned within a counterbored opening 43 at the lower end of the table hub 9 that forms an opposing abutment engaging the bearing 42 in such manner that when the lifting member 40 is in raised position, as shown in Fig. 4, the weight of the table and the material supported thereon is borne entirely by the thrust bearing. The lifting member 40 is provided with a central vertical bore 44 to receive a lifting pin or stud 45 which is retained therein by a retaining plate 46 secured to the top of the member 40 by cap screws 47. The retaining plate 46 is of larger diameter than the boss portion 39 and is disposed in a counterbored opening 49 in the top of the hub 9 in manner to support and retain the lifting member within the bore 38. For excluding foreign matter from the lifting mechanism, a cover plate 48 is secured in a larger counter-bored opening in the top of the table in manner to lie flush with the surface thereof just above but spaced from the retaining plate 46.

For actuating the lifting device to raise the table, the shaft 33 is provided at its mid portion between the threaded portions 31 and 32 with an eccentric radially acting cam portion 51 of less diameter than the threaded portions and so positioned as to engage the lower end of the lifting stud 45. When the shaft 33 is turned on its axis in direction to cause the threaded portions 31 and 32 to retract the bolts 16 and 17, the arrangement is such that cam 51 acts in direction radially of the shaft upon the stud 45, which functions as a cam follower, in manner to move the stud upward thereby moving the lifting member 40 upward and forcing the anti-friction thrust bearing 42 against the shoulder formed by the counter-bored opening 43 to positively lift the table 1 out of contact with surface 11 of the base, as shown in Fig. 4. The upward movement of the table is just sufficient to lift the lower surface 12 of the table out of engagement with the flat upper supporting surface 11 of the base 2, whereupon the table may be turned manually upon the anti-friction bearing 42 to a new position without frictional engagement with the top surface of the base.

In order to locate the table 1 approximately in the new position to which it is rotated to align the sockets 23 with the bolt ends 24 prior to lowering the table and locking it, a spring detent 53 is provided in the table for engaging a registering depression in the base. The spring detent 53 comprises a ball 54 disposed in a bore 55 extending vertically through the table 1 and pressed by a spring 56 against the top of the base 2 in manner to engage any one of a plurality of recesses or depressions 57 in the upper surface 11 of the base at positions corresponding to the positions in which the table may be locked. The detent ball 54 and the spring 56 are retained in the bore 55 by a screw cap 58 threaded into the top of the bore.

After the table 1 has been rotated to the selected new position and approximately located by the detent 53, the operating lever 3 may be turned counter-clockwise to turn the cam 51 in direction to lower the table onto the base and to simultaneously turn the threaded portions 31 and 32 in direction to move the locking bolts 16 and 17 radially outward to bring the tapered ends 24 thereof into locking engagement with the cooperating tapered sockets 23 in the respective blocks. If the table has been turned through 180° from the position shown in the drawing, the locking bolt 16 will then engage the block 19 and the bolt 17 will engage the block 18. The cam 51 is so arranged that it permits the table to move down into contact with the surface 11 of the base before the locking bolts are seated.

The locking pressures exerted by the two bolts upon the respective blocks are equalized by reason of the fact that when the bolts engage the blocks, the shaft 33 may move endwise, within the limits of clearance spaces 59 between the inner ends of the threaded portions 31 and 32, respectively, and the adjacent sides of the lifting pin 45, to balance the pressures exerted radially by the threaded portions 31 and 32 upon the bolts 16 and 17, respectively. To permit this equalizing action, the shaft 33 is journaled for axial or endwise movement in a bore 61 extending longitudinally through the base 2 and is retained therein solely by the lifting stud 45, the lower end of which extends between the shoulders or abutments formed by the ends of the threaded portions 31 and 32 at each side of the reduced diameter cam 51. The clearance space 59 provided at each side of the stud 45 is sufficient to permit the necessary endwise or floating movement of the shaft 33 for equalizing the pressure exerted upon the bolts 16 and 17, causing them to draw both ends of the table down equally upon the surface 11 of the base. To exclude foreign matter from the bore 61, the end thereof opposite that from which the shaft 33 extends is closed by a plug 62 retained in position by a cap screw 63 which also serves to secure the guiding lug 4 to the base 2. The guiding lug 5 at the other end of the base is similarly secured by a cap screw 64.

The modification of the invention shown in Fig. 6 is particularly adapted for embodiment in work holding table apparatus of relatively large size in which it is desirable to effect a downward clamping action at the mid portion of the table in addition to the clamping action effected at the ends thereof by the locking bolts. To accomplish this end, the apparatus is provided with means cooperating with the cam 51 for drawing down the central portion of the table when the shaft is turned to engage the locking bolts. As illustrated in Fig. 6, the table base is equipped with a modified centrally disposed lifting member 70 corresponding generally to the lifting member 40 of Figs. 2 and 4 but differing therefrom in that a transverse slot 71 is provided in the lower end thereof at right angles to the operating shaft 33 and of width substantially equal to that of the lifting pin 45. Seated within the slot 71 is a transversely disposed clamping shoe 72 secured by cap screws 73 and having in its upper surface a semi-cylindrical cam following groove 74 of somewhat larger radius than the cam 51 and disposed to engage the surface thereof in such manner that when the operating shaft 33 is turned to lower the table and engage the locking bolts, the cam 51 will bear down upon the bottom of the groove 74 in the clamping shoe 72 to exert a downward force upon the member 70. A retaining plate 76 secured to the top of the member 70 by cap screws 77 is seated within the countersunk opening 49 in the center of the table 1 in such manner that the downward clamping force transmitted through the member 70 from the cam 51 is exerted by the plate upon the central portion of the table 1 to draw it down into firm engagement with the supporting surface 11 of the base 2.

When it is desired to lift the table again for rotation, the shaft 33 is turned to retract the bolts 16 and 17 and to move the cam surface 51 out of clamping contact with the groove 74 of the clamping shoe 72 and into lifting contact with the stud 45 forcing it into engagement with the retaining plate 76 to move the lifting member 70 upward for supporting the table top on the thrust bearing 42. The table top may then be turned on the thrust bearing to bring a fresh work piece into position for engaging the cutter of the machine tool and then securely locked to the base again by the lever 3 actuating simultaneously the locking bolts 16 and 17 and the central clamping mechanism, for supporting the work piece rigidly while a cut is being taken.

Although but two embodiments of the invention have been shown in the drawing and described in this specification, it will be apparent to those skilled in the art that various other embodiments may be made by changing the details of construction of the mechanism shown without departing from the spirit and scope of the invention as defined in the subjoined claims.

I claim as my invention:

1. In a rotary indexing table apparatus for a machine tool, the combination with a base adapted for mounting on a machine tool, of a rotatable work supporting table pivotally mounted on the surface of said base, an operating shaft having oppositely threaded portions and a cam portion acting radially thereof journaled in said base, means cooperating with said oppositely threaded portions of said shaft and movable thereby in opposite directions for locking said table in predetermined position when said shaft is turned on its axis in one direction, and means including a cam follower cooperating with said cam portion and acting radially of said shaft for positively lifting said table from the surface of said base for rotation relative thereto when said shaft is turned in the other direction.

2. In a rotary indexing table apparatus for a machine tool, the combination with a base adapted for mounting on a machine tool, of a rotatable table pivotally mounted on said base to rest upon the surface thereof, an operating shaft journaled in said base said shaft having threaded portions and a cam portion said cam portion being of less diameter than and disposed between said threaded portions providing spaced thrust surfaces, means cooperating with said threaded portions of said shaft for locking said table in predetermined position when said shaft is turned in one direction, and means cooperating with said reduced diameter cam portion of said shaft for raising said table out of contact with the surface of said base for pivotal movement relative thereto when said shaft is turned in the other direction, said table raising means engaging said reduced diameter cam portion and cooperating with said spaced thrust surfaces in manner to limit endwise movement of said shaft in said base.

3. A rotary work supporting table apparatus, comprising a base adapted to be mounted on a machine tool said base having a table receiving surface, a rotatable table pivotally mounted on said base and normally resting upon said table receiving surface, means including a thrust bearing associated with the pivotal mounting element of said table and disposed to be moved to lift said table and to pivotally support it for rotation out of contact with said table receiving surface of said base, a rotatable operating shaft journaled in said base transversely to the pivot axis of said pivotally mounted table and having an eccentrically positioned portion disposed to act radially of said shaft to exert force upon said thrust bearing means in manner to lift or lower said table when said shaft is turned on its axis, means for turning said shaft, and means for positioning said table in any one of a plurality of predetermined angular positions.

4. A rotary work supporting table apparatus, comprising a base adapted to be fastened to a machine tool, a rotatable table pivotally mounted on said base, a pair of locking bolts slidably mounted in said base at diametrically opposed positions for radially outward movement to engage and lock said table, and a threaded operating shaft journaled for rotational and axial movement in said base and having threaded engagement with said locking bolts in manner to move said bolts simultaneously in opposite directions radially outward to lock said table, said bolts exerting equal locking pressure upon said table by reason of an equalizing action of said threaded shaft in moving axially in said base.

5. A rotary work supporting table apparatus, comprising a base adapted to be fastened to a machine tool said base having a flat top surface and a central hub receiving bore, a rotatable table having a central depending hub and a flat lower surface mounted on said base with said hub rotatably engaging said central hub receiving bore and said flat lower surface engaging the flat top surface of said base, locking bolts slidably mounted in said base for movement in diametrically opposed directions, locking blocks on said table disposed to receive said bolts to lock said table in predetermined position, an operating shaft journaled in said base transversely of the axis of rotation of said table said shaft having oppositely threaded portions engaging respectively with threaded portions on said oppositely positioned locking bolts to move said bolts simultaneously in opposite directions for locking or unlocking said table and said shaft having an eccentric portion disposed beneath the hub of said table, an anti-friction thrust bearing disposed beneath said table hub and associated with said eccentric portion of said operating shaft in such manner that when said shaft is turned to unlock said table said eccentric portion acts upon said thrust bearing to lift said table out of contact with the top surface of said base and support it upon said thrust bearing for ready rotation to another position.

6. In a rotary indexing table, a base for mounting on a machine tool, an operating shaft rotatably journaled in said base said shaft having spaced oppositely threaded portions and an eccentric cam portion of less diameter than and disposed between said threaded portions, a cam follower slidably mounted in said base and engaging said eccentric portion between abutments formed by the ends of said threaded portions in manner to retain said shaft within said base and to permit limited longitudinal movement thereof, a thrust bearing carried by said cam follower, a rotatable table pivotally mounted on said base in manner to be carried by said thrust bearing when said cam is in one position and to rest on said base when said cam is in another position, and locking means associated with each of said oppositely threaded portions in manner to lock said table in predetermined position when said shaft is turned to position said cam for resting said table on said base said shaft moving axially as may be required to equalize the force exerted by each of said threaded portions on said locking means within the limits established by said cam follower coacting with said eccentric between the ends of said threaded portions.

7. In a rotary indexing table apparatus, a base for mounting on a machine tool, an operating shaft rotatably journaled in said base said shaft having spaced oppositely threaded portions and an eccentric cam portion of less diameter than and disposed between said threaded portions, a cam follower slidably mounted in said base and engaging said eccentric cam portion between abutments formed by the ends of said threaded portions in manner to retain said shaft within said base and to permit limited longitudinal movement thereof, a thrust bearing carried by said cam follower, a rotatable table pivotally mounted on said base in manner to be carried by said thrust bearing when said cam is in one position and to rest on said base when said cam is in another position, locking means associated with each of said oppositely threaded portions and disposed to engage the ends of said table to locate it angularly in predetermined position and to draw said ends down upon said base when said shaft is turned to position said cam for resting said table on said base said shaft moving axially as may be required to equalize the force exerted by each of said threaded portions on said locking means within the limits established by said cam follower coacting with said cam between the ends of said threaded portions, and clamping means associated with said cam for drawing the central portion of said table down upon said base when said shaft is turned to locking position.

8. In a rotary indexing table attachment for a machine tool, the combination with a base and a table pivotally mounted thereon, of means for lifting said table from said base for rotation relative thereto, means including a cam and a cooperating cam follower disposed to positively operate said table lifting means in lifting said table, a pair of locking bolts disposed at the respective ends of said table and associated with said operating means in manner to be operated thereby when said operating means is moved in lowering said table to locate the ends of said table in predetermined position and to lock both of said ends down against said base, and clamping means associated with said cam operated lifting means and operative when said table is lowered to be engaged by said cam in manner to draw down and clamp the central portion of said table against said base, whereby rigid support of said table throughout its entire length is effected.

9. In a rotary indexing table device the combination of a base, an operating shaft rotatably journaled in said base said shaft having axially spaced threaded portions and a cam portion of less diameter than and disposed between said threaded portions to provide spaced shoulders on said shaft, a cam follower slidably carried by said base and engaging said cam portion between said shoulders, said cam follower being of less width than the shoulder spacing to permit limited axial movement of said shaft, a table rotatably mounted on said base, a thrust bearing shiftable relative to said base to support said table for rotating, means connecting said cam follower to shift said thrust bearing in one direction to support said table and in the other direction to permit said table to rest on said base, and locking means operative from said threaded portions to lock said table against rotation when said table is resting on said base, said locking means including oppositely movable members and said shaft moving axially to equalize the force exerted by said threaded portions on said members.

10. In a rotary indexing table device the combination of a base, an operating shaft rotatably journaled in said base said shaft having axially spaced threaded portions and a cam portion of less diameter than and disposed between said threaded portions to provide spaced shoulders on said shaft, a cam follower slidably carried by said base and engaging said cam portion between said shoulders, said cam follower being of less width than the shoulder spacing to permit limited movement of said shaft, a table rotatably mounted on said base, a thrust bearing shiftable relative to said base to support said table for rotation, means connecting said cam follower to shift said thrust bearing in one direction to support said table and in another direction for said table to rest on said base, and locking means operative to lock said table against rotation when said table is resting on said base, said locking means including oppositely movable members operative from said threaded portions and another member downwardly movable from said cam, said shaft moving axially to equalize the force exerted by said threaded portions on said oppositely movable members.

11. A rotatable work holder for a machine tool, comprising a base, a table pivotally mounted on said base, a pair of locking bolts carried by said base and arranged to be moved in opposite directions simultaneously to engage and lock said table in any one of a plurality of predetermined positions, an operating shaft journaled in said base for rotational and for endwise equalizing movement, and means on said shaft acting axially thereof in opposite directions respectively upon rotational movement of said shaft and functioning to move said bolts individually in manner to lock said table, said shaft moving axially in one or the other direction to cause said means to exert equal forces upon said locking bolts by reason of said endwise equalizing movement of said shaft in balancing the oppositely acting axial forces exerted upon said bolts.

12. In a rotatable work support for a machine tool, in combination, a base adapted to be fastened to a machine tool, a table pivotally mounted on said base and having a plurality of tapered locating sockets arranged in diametrically opposed pairs, a pair of locking bolts having ends tapered complementary to said sockets disposed in said base at diametrically opposed positions for cooperating respectively with a selected pair of said sockets, and actuating means arranged to move said locking bolts in opposite directions into simultaneous engagement with said sockets in manner to accurately locate said table said actuating means including a rotatable and endwise movable shaft operative upon rotation to exert equal and opposite forces on said bolts to lock said table to said base with equalized pressure.

13. An indexing table attachment for a machine tool, comprising a base, a table pivotally mounted on said base, said table having a lifting element, an operating shaft journaled in said base transversely to the pivot axis of said table and having an eccentrically disposed portion arranged to act radially of said shaft upon the lifting element of said table and operative when said shaft is turned on its axis to a predetermined position to raise said table for rotation relative to said base and when said shaft is turned on its axis to another position to lower said table onto said base, means for locking said table to said base in predetermined position thereon, and means on said shaft operative upon rotation thereof in lowering said table onto said base to actuate said table locking means in manner to lock said table after it arrives at its lowered position.

14. A rotary indexing table apparatus for use with a machine tool, comprising a base adapted to be mounted on a machine tool, a rotatable work supporting table pivotally mounted on said base, an operating shaft journaled in said base, said shaft having a threaded portion and a radially acting cam portion, means cooperating with said threaded portion of said shaft and movable thereby when said shaft is turned on its axis to lock said table against pivotal movement, and radially acting means cooperating with said cam portion of said shaft and operative to lift said table from said base when said shaft is turned in direction to unlock said table.

FRANK W. CURTIS.